No. 804,391. PATENTED NOV. 14, 1905.
W. C. & C. R. GIBSON.
AUTOMATIC CHECK ROW CORN PLANTER.
APPLICATION FILED FEB. 6, 1905.

UNITED STATES PATENT OFFICE.

WILLIAM C. GIBSON AND CLINTON R. GIBSON, OF HUMMER, SOUTH DAKOTA.

AUTOMATIC CHECK-ROW CORN-PLANTER.

No. 804,391.     Specification of Letters Patent.     Patented Nov. 14, 1905.

Application filed February 6, 1905. Serial No. 244,988.

*To all whom it may concern:*

Be it known that we, WILLIAM C. GIBSON and CLINTON R. GIBSON, citizens of the United States, residing at Hummer, in the county of Charlesmix and State of South Dakota, have invented a new and useful Automatic Check-Row Corn-Planter, of which the following is a specification.

Our object is to provide a new mechanism specially adapted to be utilized for automatically actuating the seed-dropping devices of corn-planters to simultaneously plant two parallel rows at regular intervals of time and space as required to produce check-rows in a field.

Our invention consists in the construction, arrangement, and combination of parts to produce a new operative device and applying it with common operative devices to a corn-planter carriage, as hereinafter set forth, pointed out in our claims, and illustrated in the accompanying drawings, in which—

Figure 1 is a top view that shows all the operative parts in their positions relative to each other on the carriage-frame. Fig. 2 is an enlarged view that shows the forms of the different elements that coact in imparting intermittent rotary motion to the rotatable shaft that is designed to actuate seed-dropping mechanism in the seedboxes. Fig. 3 is a longitudinal sectional elevation of the planter and shows the positions of the operative parts relative to each other and the carriage-frame.

The numerals 10 designate the carriage-frame of a corn-planter that may vary in material and form, as desired. It is mounted on a rotatable axle 12, that has fixed traction-wheels 13 on its ends, and on runners or furrow-openers 14 at its front end. A rotatable shaft 15 is mounted in bearings fixed to the frame and in parallel position with bench 16, upon the ends of which are fixed seedboxes 17, designed to be provided with seed-dropping devices in their bottoms and connected with the ends of the rotatable shaft 15. On the shaft 15 is a fixed ratchet-wheel 18, and at its side is a duplex lever and pawl-carrier 19, mounted loosely thereon in such a manner that a pawl 20, pivotally connected with the upper arm $a$ of the lever will engage the ratchet-wheel 18, as required to impart intermittent rotary motion to the ratchet-wheel and rotatable shaft at regular intervals of time and space when the machine is advanced and the duplex lever is actuated by means of gearing, which consists of a sprocket-wheel 21, loosely mounted on the carriage-axle 12, and a small sprocket-wheel 22, fixed on a rotatable shaft 23 in parallel position with the shaft 15, and a crank-arm 24, fixed to the shaft 23 at the side of the sprocket-wheel 22 in such a manner that the rotary motion of the shaft 23 will cause the arm $a$ of the duplex lever 19 to vibrate on the shaft 15 and by means of the pawl 20 impart a fraction of a revolution to the shaft 15, and as the crank-arm 24 continues its revolution it engages the lower arm $b$ of the duplex lever 19, as indicated by dotted lines in Fig. 2, and thereby returns the arm $a$ and pawl 20 to their normal positions relative to the ratchet-wheel 18 and shaft 15, as required to get a new hold thereon for imparting a fractional rotary motion thereto.

It is obvious the sprocket-wheels 21 and 22, connected by a chain 25, may vary in size, as required to suit the diameters of the carriage-wheels 13 and to regulate the spaces between the points in the rows where the seeds are to be planted.

A clutch member 26 is fixed to the sprocket-wheel 21, and a mating member 27 is slidably placed on the axle 12 and provided with a lever 28 in such a manner that a driver on the seat 29 can readily throw the sprocket-wheels in and out of gear at pleasure.

Having thus set forth the purpose of our invention, its construction and application, the practical operation and utility thereof will be readily understood by farmers and others familiar with the art to which it pertains, and

What we claim as new, and desire to secure by Letters Patent, is—

1. In a check-row corn-planter, mechanism for carrying and actuating a pawl consisting of a duplex lever pivoted to a rotatable shaft, a fixed ratchet-wheel on said shaft and a pawl pivoted to the upper arm of said duplex lever, and means for moving the duplex lever in reverse ways at regular intervals of time and space for the purposes stated.

2. In a check-row corn-planter, a rotatable shaft extending from one seedbox to the other, a ratchet-wheel fixed to said shaft, a duplex lever pivoted to said shaft aside of said ratchet-wheel, a pawl pivoted to said duplex lever, a rotatable parallel shaft, a sprocket-wheel and a crank-arm fixed to said parallel shaft, arranged and combined to operate in the manner set forth for the purposes stated.

3. In a check-row corn-planter, a rotatable shaft extending from one seedbox to the other, a ratchet-wheel fixed to said shaft, a duplex lever pivoted to said shaft aside of said ratchet-wheel, a pawl pivoted to said duplex lever, a rotatable parallel shaft, a sprocket-wheel and a crank-arm fixed to said parallel shaft, a rotatable carriage-axle, a sprocket-wheel loosely mounted on said axle and provided with a fixed clutch member, a mating clutch member adjustable on said axle, a chain connecting the two sprocket-wheels and means for adjusting the sliding clutch member, arranged and combined to operate in the manner set forth for the purposes stated.

WILLIAM C. GIBSON.
CLINTON R. GIBSON.

Witnesses:
W. W. HANEY,
J. W. LINDSAY.